(12) United States Patent
Ikeuchi et al.

(10) Patent No.: US 8,983,769 B2
(45) Date of Patent: Mar. 17, 2015

(54) MAP INFORMATION PROCESSING APPARATUS

(75) Inventors: Tomoya Ikeuchi, Tokyo (JP); Masaharu Umezu, Tokyo (JP); Makoto Mikuriya, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 663 days.

(21) Appl. No.: 13/221,300

(22) Filed: Aug. 30, 2011

(65) Prior Publication Data

US 2011/0313661 A1    Dec. 22, 2011

Related U.S. Application Data

(62) Division of application No. 11/792,250, filed as application No. PCT/JP2005/020625 on Nov. 10, 2005.

(30) Foreign Application Priority Data

Feb. 8, 2005    (JP) .................................. 2005-032016

(51) Int. Cl.
*G01C 21/34*    (2006.01)
*G01C 21/32*    (2006.01)

(52) U.S. Cl.
CPC ...................................... *G01C 21/32* (2013.01)
USPC ............................. 701/409; 701/408; 701/450

(58) Field of Classification Search
USPC .......................... 701/208, 209, 408, 409, 450
See application file for complete search history.

(56) References Cited

U.S. PATENT DOCUMENTS

| 6,075,467 A | 6/2000 | Ninagawa | |
|---|---|---|---|
| 6,202,024 B1 * | 3/2001 | Yokoyama et al. | 701/420 |
| 6,708,113 B1 | 3/2004 | Von Gerlach et al. | |
| 2004/0151388 A1 * | 8/2004 | Maeda | 382/232 |
| 2006/0241862 A1 | 10/2006 | Ichihara et al. | |

FOREIGN PATENT DOCUMENTS

| DE | 198 37 618 A1 | 3/1999 |
|---|---|---|
| DE | 10258470 A1 | 7/2004 |
| DE | 19933638 A1 | 1/2011 |
| JP | 6-88733 A | 3/1994 |
| JP | 9-292239 A | 11/1997 |
| JP | 10-89975 A | 4/1998 |
| JP | 10-267676 A | 10/1998 |

(Continued)

*Primary Examiner* — John Q Nguyen
*Assistant Examiner* — Kyung Kim
(74) *Attorney, Agent, or Firm* — Birch, Stewart, Kolasch & Birch, LLP

(57) ABSTRACT

An apparatus includes a map information storage section for storing map information on an area by area basis formed in meshes; a positioning section for measuring its own present location; a new road detecting section; a new road registration decision section for deciding that the new road is additionally registerable to the map information stored in the map information storage section when the road density in the area including the new road detected by the new road detecting section is equal to or less than a predetermined value; and a new road registration section for making additional registration of the new road, as to which the new road registration decision section makes an additionally registerable decision, to the map information stored in the map information storage section.

4 Claims, 13 Drawing Sheets

(56) References Cited

FOREIGN PATENT DOCUMENTS

| JP | 11-161157 A | 6/1999 |
| JP | 2000-146608 A | 5/2000 |
| JP | 2001-84491 A | 3/2001 |
| JP | 2002-485559 A | 2/2002 |
| JP | 2003-97958 A | 4/2003 |
| JP | 2003-130656 A | 8/2003 |
| JP | 2003-247843 A | 9/2003 |
| JP | 2003-337026 A | 11/2003 |
| JP | 2004-251790 A | 9/2004 |
| JP | 2004-354095 A | 12/2004 |
| WO | WO 2004/090472 A1 | 10/2004 |

* cited by examiner

MAP INFORMATION PROCESSING APPARATUS

This application is a Divisional of co-pending application Ser. No. 11/792,250, filed on Jun. 4, 2007, which is the national phase of PCT International Application No. PCT/JP05/020625 filed on Nov. 10, 2005 under 35 U.S.C. §371. This application claims priority of Application No. JP 2005-032016 filed in Japan on Feb. 8, 2005 under 35 U.S.C. §119; the entire contents of all are hereby incorporated by reference.

TECHNICAL FIELD

The present invention relates to a map information processing apparatus for processing map information to be displayed, and more particularly to technology for automatically updating existing map information when a new road is detected.

BACKGROUND ART

Conventionally, a map information processing apparatus has been known which updates, when traveling a place whose roads are not recorded in its own map information, its map information by detecting the traveling route from its traveling record and by adding it to the map information as a new road. If such a map information processing apparatus adds a new road having a positioning error to the existing map information, a user will suffer a great disadvantage because a result of a subsequent route search will differ from an actually travelable route.

Accordingly, Patent Document 1, for example, discloses a car navigation system that makes a decision as to whether a new road is to be added to the existing map information or not using receiving conditions of a GPS (Global Positioning System). If the present location detected by a position detecting means is not present on any road indicated by the map information stored in the initial recording area of a navigation recording medium, the car navigation system carries out the processing repeatedly that acquires the present location and writes it to an additional recording area of the recording medium. During the processing, the car navigation system estimates the GPS receiving conditions, that is, the positioning error contained in the new road information, from the number of GPS satellites from which the GPS signals can be received. Then, it adds the new road information to the existing map information only when the estimated error is smaller than a prescribed value. The configuration can prevent generating and recording new road information from the GPS signals in poor receiving conditions, and thus prevent the new road information having the positioning error from being added to the existing map information.

Patent Document 1: Japanese patent application laid-open No. 2002-48559.

The technique described in the foregoing Patent Document 1, however, has the following problem. Specifically, the positioning error can actually exist in spite of good GPS receiving conditions, and particularly urban areas have a problem of the so-called multipath problem caused by that surrounding buildings reflect the signals from the GPS satellites. Accordingly, even if the number of GPS signals received from the GPS satellites is enough, the positioning error can sometimes be very large. Thus, the technique, which estimates the positioning error of the new road from the GPS receiving conditions and employs the estimation result as a reference for deciding whether to register the new road as an additional record, presents a problem of exerting adverse effect on the existing functions such as the navigation functions.

The present invention is implemented to solve the foregoing problem. Therefore it is an object of the present invention to provide a map information processing apparatus capable of circumventing the adverse effect on the existing functions by registering only after an appropriate decision as to whether to make additional registration of the new road to the existing map information.

DISCLOSURE OF THE INVENTION

A map information processing apparatus in accordance with the present invention includes: a map information storage section for storing map information on an area by area basis formed in meshes; a positioning section for measuring its own present location; a new road detecting section for deciding that a new road is detected when the present location measured by the positioning section is on a road not included in the map information stored in the map information storage section; a new road registration decision section for deciding that the new road is additionally registrable to the map information stored in the map information storage section when road density in an area including the new road detected by the new road detecting section is equal to or less than a predetermined value; and a new road registration section for making additional registration of the new road, as to which the new road registration decision section makes an additionally registrable decision, to the map information stored in the map information storage section.

According to the present invention, the map information processing apparatus is configured in such a manner as to decide whether to make additional registration of the new road to the existing map information based on the road density in an area formed by dividing into meshes. Thus, it can add the new road not written on the map to the existing map information with preventing the adverse effect on the existing functions due to the addition of the new road, which can include a positioning error, to the existing map information.

BEST MODE FOR CARRYING OUT THE INVENTION

The best mode for carrying out the invention will now be described with reference to the accompanying drawings to explain the present invention in more detail.

Embodiment 1

Figure 1:
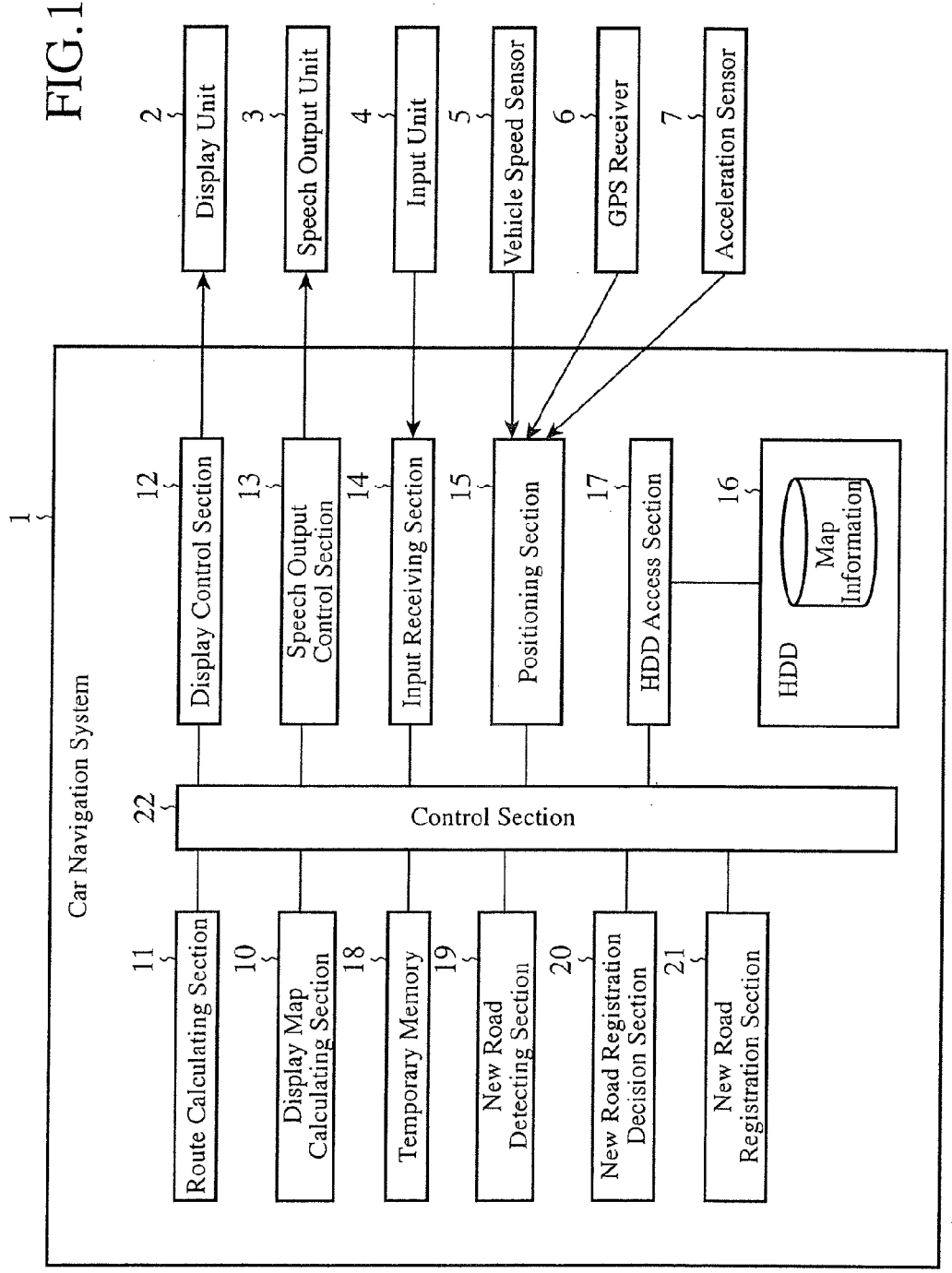
FIG. 1 is a block diagram showing a configuration of a map information processing apparatus of an embodiment 1 in accordance with the present invention.

FIG. 1 is a block diagram showing a configuration of a map information processing apparatus of an embodiment 1 in accordance with the present invention. The map information processing apparatus comprises a car navigation system 1, a display unit 2, a speech output unit 3, an input unit 4, a vehicle speed sensor 5, a GPS receiver 6 and an acceleration sensor 7. The car navigation system 1 has a function of updating the map information in addition to the well-known navigation functions. The car navigation system 1 will be described in more detail later.

The display unit 2 is composed of a liquid crystal display unit, for example, and displays a map image for display and the optimum route to a destination in accordance with display data delivered from the car navigation system 1. The speech output unit 3 is composed of a speaker, for example. It outputs speech for guiding the user to the destination along the optimum route, and speech about prescribed information included in the map information in accordance with the speech data delivered from the car navigation system 1.

The input unit 4 is composed of input buttons mounted on the main panel constituting the front of the car navigation system 1, a remote control for sending an input signal equivalent to that of the input buttons, a touch panel placed on the screen of the display unit 2 or a microphone for making a speech input (none of them is shown); or is composed of a combination of them. The input unit 4 is used by the user to input a map area to be displayed on the display unit 2, and the starting point, ending point and the like for calculating the optimum route. The input signal fed from the input unit 4 is delivered to the car navigation system 1 as operation data.

The vehicle speed sensor 5 measures its own traveling speed. The traveling speed measured by the vehicle speed sensor 5 is delivered to the car navigation system 1 as speed data. The GPS receiver 6 receives GPS signals transmitted from the GPS satellites. The GPS signals received by the GPS receiver 6 are delivered to the car navigation system 1 as GPS data. The acceleration sensor 7 measures changes in the horizontal direction and vertical direction of its own. The changes in the horizontal direction and vertical direction measured by the acceleration sensor 7 are delivered to the car navigation system 1 as acceleration data.

Next, the details of the car navigation system 1 will be described. The car navigation system 1 includes a display map calculating section 10, a route calculating section 11, a display control section 12, a speech output control section 13, an input receiving section 14, a positioning section 15, an HDD (Hard Disk Drive) 16, an HDD access section 17, a temporary memory 18, a new road detecting section 19, a new road registration decision section 20, a new road registration section 21 and a control section 22.

According to procedures programmed in advance, the control section 22 controls data transmission and reception between the display map calculating section 10, route calculating section 11, display control section 12, speech output control section 13, input receiving section 14, positioning section 15, HDD access section 17, temporary memory 18, new road detecting section 19, new road registration decision section 20 and new road registration section 21, which constitute the car navigation system 1. The data transmission and reception between the components are carried out via the control section 22. For the sake of brevity of the explanation, the following description is made without referring to the fact that the data transmission and reception is carried out via the control section 22.

The display map calculating section 10 calculates the map image for display from the map information delivered from the HDD 16 via the HDD access section 17 and the positioning data delivered from the positioning section 15. The map image for display calculated by the display map calculating section 10 is delivered to the display control section 12. The route calculating section 11 sets as the starting point of the route the present location indicated by the positioning data delivered from the positioning section 15 or the position delivered from the input receiving section 14; sets as the ending point of the route the other position delivered from the input receiving section 14; and calculates the optimum route (sometimes referred to as a "recommended route") between the two points. The optimum route calculated by the route calculating section 11 is delivered to the display control section 12.

The display control section 12 converts the map image for display delivered from the display map calculating section 10 and the optimum route delivered from the route calculating section 11 to the format the display unit 2 can display, and delivers to the display unit 2 as the display data. The speech output control section 13 converts the speech information for leading the way to the destination in accordance with the optimum route delivered from the route calculating section 11 and the speech information for providing the driver with the prescribed information contained in the map information to the format the speech output unit 3 can output, and delivers to the speech output unit 3 as the speech data.

The input receiving section 14 receives the operation data delivered from the input unit 4 connected to the outside. The operation data received by the input receiving section 14 is delivered to the display map calculating section 10, route calculating section 11 and the like. The positioning section 15 determines its own present location from the speed data from the vehicle speed sensor 5, the acceleration data from the acceleration sensor 7 and the GPS data from the GPS receiver 6; compares the determined present location with the road information contained in the map information read from the HDD 16 via the HDD access section 17; and calculates on which road the present location is placed among the roads indicated by the road information. The result calculated by the positioning section 15 is delivered to the display map calculating section 10 and route calculating section 11 as the positioning data. The positioning data is used by the display map calculating section 10 to calculate its own neighboring map, and by the route calculating section 11 to calculate the optimum route.

The HDD 16 corresponds to a map information storage section in accordance with the present invention. The HDD 16 records the map information including the road data in advance at the shipment of the car navigation system 1. The map information is arranged as a set of area map information items about individual areas reticulated by latitude and longitude lines. Each area is referred to as "mesh". The HDD access section 17 controls writing and reading of the data to and from the HDD 16. The temporary memory 18, which is composed of a volatile memory, for example, is used for temporarily storing data.

When the display map calculating section 10, route calculating section 11, speech output control section 13 and positioning section 15 each carry out their processing using the road information about a road (referred to as "existing road" from now on) contained in the map information recorded in the HDD 16, they each read the area map information corresponding to the mesh used in the processing from the HDD 16 through the HDD access section 17, store the read data in the temporary memory 18, and carry out the processing using the stored data.

The new road detecting section 19 compares the map information read from the HDD 16 via the HDD access section 17 with the vehicle position contained in the positioning data delivered from the positioning section 15; and detects the road the vehicle is traveling as a new road if the vehicle position is not on any existing roads. The coordinates of the new road detected by the new road detecting section 19 are stored in the temporary memory 18.

The new road registration decision section 20 reads the coordinates of the new road detected by the new road detecting section 19 from the temporary memory 18; and decides whether to make additional registration of the road represented by the coordinates to the map information that has already been stored in the HDD 16. The decision result by the new road registration decision section 20 is delivered to the new road registration section 21. The processing carried out by the new road registration decision section 20 will be described in detail later.

The new road registration section 21 delivers the new road information about the new road passing through the positive decision by the new road registration decision section 20 to the HDD 16 via the HDD access section 17 to make additional registration of the new road to the map information that has already been recorded in the HDD 16.

Figure 2:
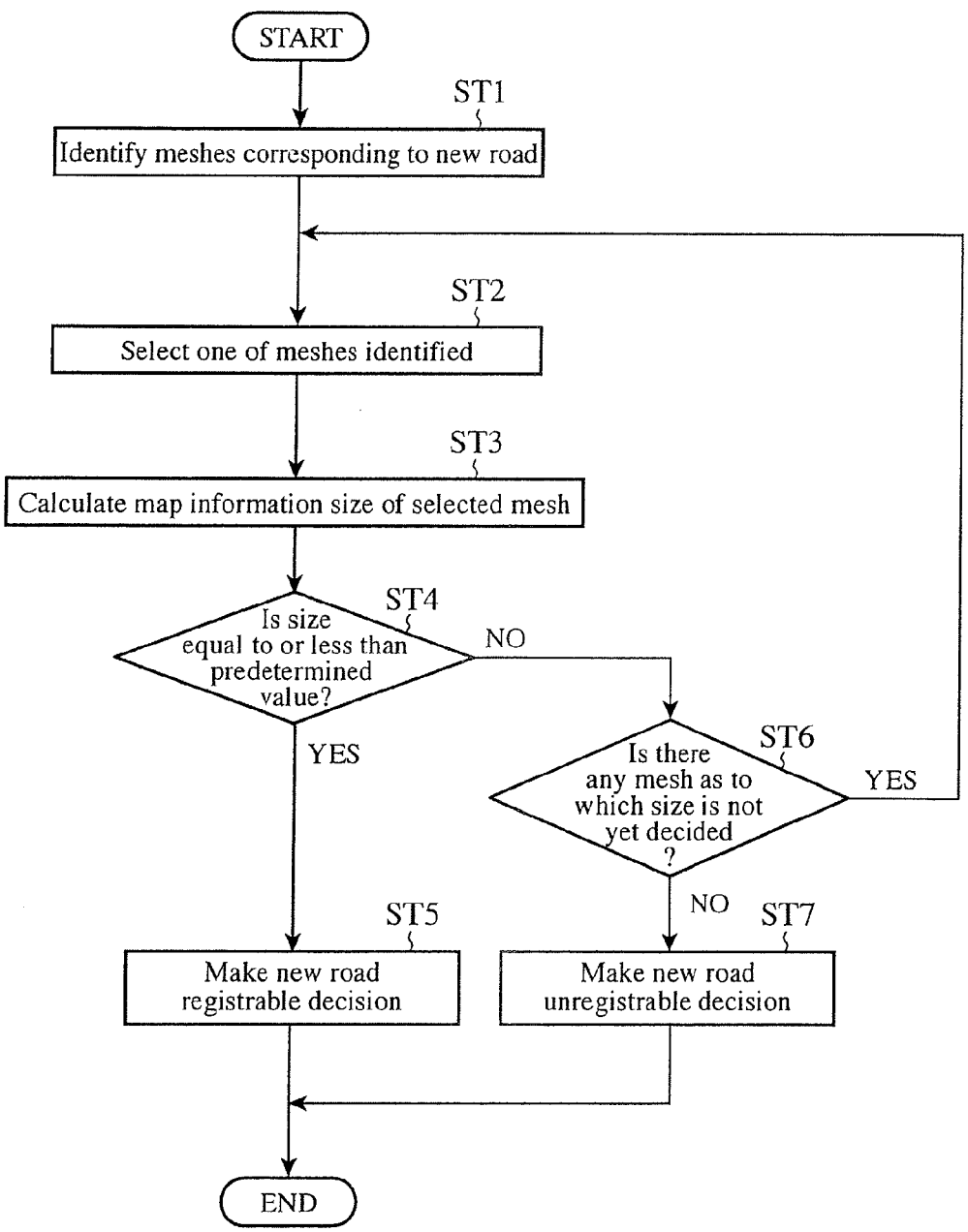
FIG. 2 is a flowchart illustrating registration decision processing carried out by a new road registration decision section of the map information processing apparatus of the embodiment 1 in accordance with the present invention.

Next, referring to the flowchart shown in FIG. 2, the operation of the map information processing apparatus of the embodiment 1 in accordance with the present invention will be described with concentrating on the registration decision processing carried out by the new road registration decision section 20. The map information processing apparatus of the embodiment 1 employs map information size as road density.

When the new road registration decision section 20 starts the registration decision processing, it identifies the map information mesh corresponding to the new road to be decided (step ST1). When the new road extends over a plurality of meshes, all the meshes are identified. When the map information has a plurality of levels, the mesh is identified at the level the positioning section 15 uses. When the map information consists of a plurality of types of the map information, the mesh is identified in the map information of the type the positioning section 15 uses.

Subsequently, one of the meshes identified at step ST1 is selected (step ST2). Then the map information size of the selected mesh is calculated (step ST3). Subsequently, the map information size calculated at step ST3 is compared with a predetermined value (step ST4). When it has been decided at step ST4 that the map information size is equal or less than the predetermined value, a new road registrable decision is made (step ST5), and the registration decision processing is completed. The decision result of the new road registration decision section 20 is delivered to the new road registration section 21 as described above.

In contrast, when it has been decided at step ST4 that the map information size of the mesh calculated at step ST3 is greater than the predetermined value, the presence or absence of a mesh that has not yet passed the information size decision is checked among the meshes identified at step ST1 (step ST6). When it has been decided at step ST6 that the uncompleted mesh is present, the sequence is returned to step ST2. On the other hand, when it has been decided that the uncompleted mesh is not present, the new road unregistrable decision is made (step ST7), and the registration decision processing is completed. The decision result of the new road registration decision section 20 is delivered to the new road registration section 21 as described above.

As described above, the map information processing apparatus of the embodiment 1 in accordance with the present invention is configured in such a manner as to employ the map information size of the mesh as the road density, and to make a decision whether to conduct additional registration of the new road information to the existing map information according to the map information size. Thus, the present embodiment 1 can add the new road not present on the map to the existing map information with eliminating or reducing the adverse effect on the navigation functions resulting from adding the new road information including the positioning error to the existing map information. In addition, since it employs the map information size as the road density, it can reduce the amount of calculation and calculate the road density in a very short time.

Although the present embodiment 1 is configured in such a manner as to make additional registration of the new road information representing the new road into the map information already stored in the HDD 16, this is not essential. For example, such a configuration is also possible which stores the new road information on a mesh by mesh basis in the HDD 16 independently of the map information, and refers to the new road map information corresponding to that mesh when the HDD access section 17 accesses the map information about a particular mesh. The configuration offers the same advantage as described above.

In addition, although the present embodiment 1 is configured in such a manner as to make a new road unregistrable decision when the map information size of all the meshes is greater than the predetermined value when the new road extends over a plurality of meshes, this is not essential. For example, such a configuration is also possible which makes a new road unregistrable decision when the map information size of at least one mesh is greater than the predetermined value. The configuration offers an advantage of being able to reduce the amount of calculation.

Embodiment 2

The map information processing apparatus of an embodiment 2 in accordance with the present invention decides whether to make additional registration of the new road to the existing map information by using as the road density the number of links connecting a node to another node, that is, the number of roads connecting an intersection to another intersection.

The configuration of the map information processing apparatus of the present embodiment 2 is the same as that of the map information processing apparatus of the embodiment 1 as shown in FIG. 1 except for the processing executed by the new road registration decision section 20.

Figure 3:
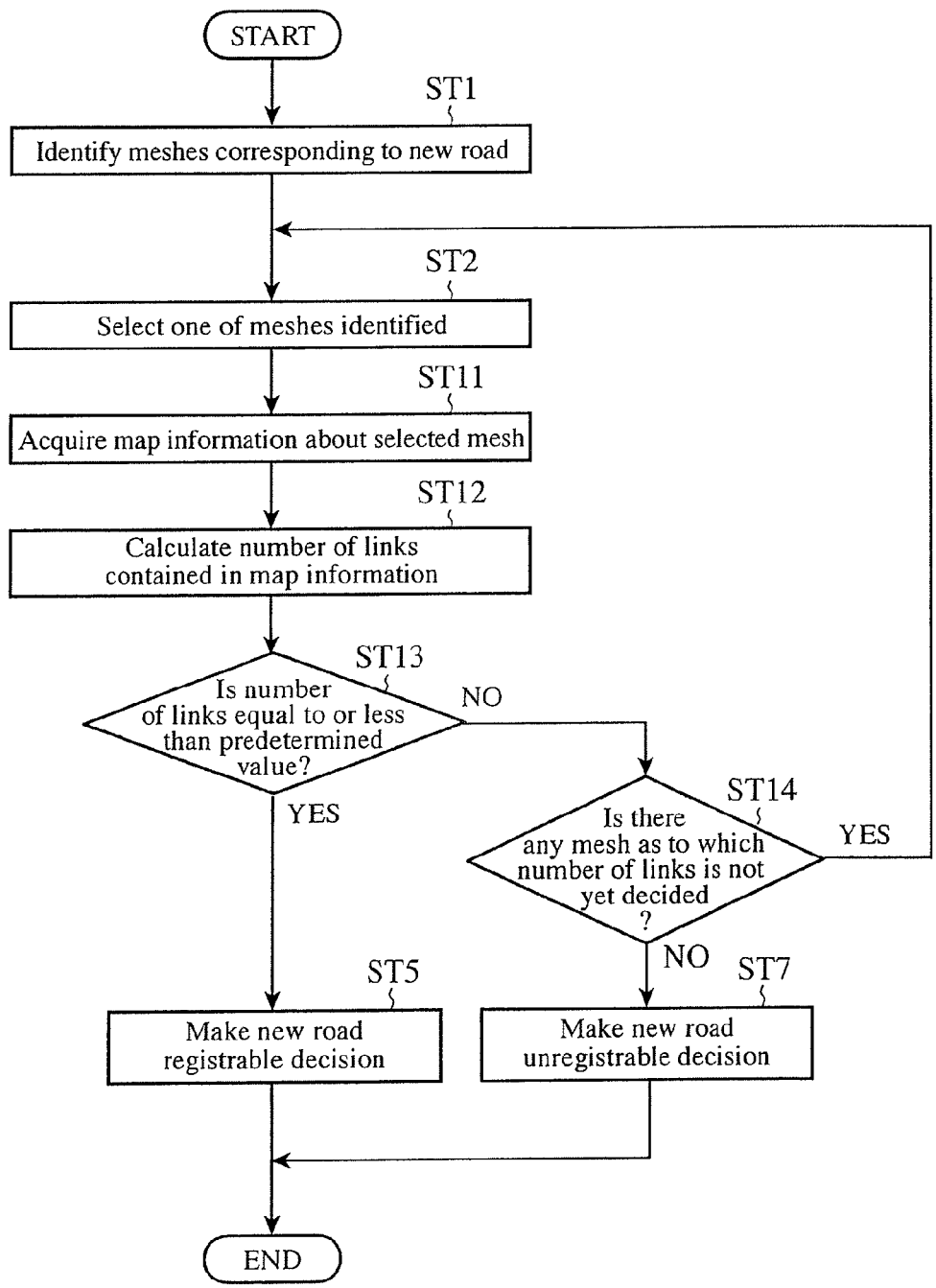
FIG. 3 is a flowchart illustrating the registration decision processing carried out by the new road registration decision section of the map information processing apparatus of an embodiment 2 in accordance with the present invention.

FIG. 3 is a flowchart illustrating the registration decision processing carried out by the new road registration decision section 20 of the map information processing apparatus of the present embodiment 2. When the new road registration decision section 20 starts the registration decision processing, it identifies the map information mesh corresponding to the new road to be decided (step ST1). When the new road extends over a plurality of meshes, all the meshes are identified. When the map information has a plurality of levels, the mesh is identified at the level the positioning section 15 uses. When the map information consists of a plurality of types of the map information, the mesh is identified in the map information of the type the positioning section 15 uses.

Subsequently, one of the meshes identified at step ST1 is selected (step ST2). Then the map information about the selected mesh is obtained (step ST11). Subsequently, the number of links (the number of roads) included in the map information obtained at step ST11 is calculated (step ST12). Then, the number of links calculated at step ST12 is compared with a predetermined value (step ST13). When it has been decided at step ST13 that the number of links is equal to or less than the predetermined value, a new road registrable decision is made (step ST5), and the registration decision processing is completed. The decision result of the new road registration decision section 20 is delivered to the new road registration section 21 as described above.

In contrast, when it has been decided at step ST13 that the number of links calculated at step ST3 is greater than the predetermined value, the presence or absence of a mesh that has not yet passed the decision as to the number of links is checked among the meshes identified at step ST1 (step ST14). When it has been decided at step ST14 that the uncompleted mesh is present, the sequence is returned to step ST2. On the other hand, when it has been decided that the uncompleted mesh is not present, the new road unregistrable decision is made (step ST7), and the registration decision processing is completed. The decision result of the new road registration decision section 20 is delivered to the new road registration section 21 as described above.

As described above, the map information processing apparatus of the embodiment 2 in accordance with the present invention is configured in such a manner as to make a decision whether to conduct additional registration of the new road information to the existing map information according to the number of roads used as the road density, that is, the number of links in the map information. Thus, the present embodiment 2 can add the new road not present on the map to the existing map information with eliminating or reducing the adverse effect on the navigation functions resulting from adding the new road information including the positioning error to the existing map information. In addition, since it employs the number of links as the road density, it can calculate the road density accurately in a short time.

Embodiment 3

The map information processing apparatus of an embodiment 3 in accordance with the present invention decides whether to make additional registration of the new road to the existing map information by using as the road density the total length of the links connecting a node to another node, that is, the total length of the roads connecting an intersection to another intersection.

The configuration of the map information processing apparatus of the present embodiment 3 is the same as that of the map information processing apparatus of the embodiment 1 as shown in FIG. 1 except for the processing executed by the new road registration decision section 20.

Figure 4:
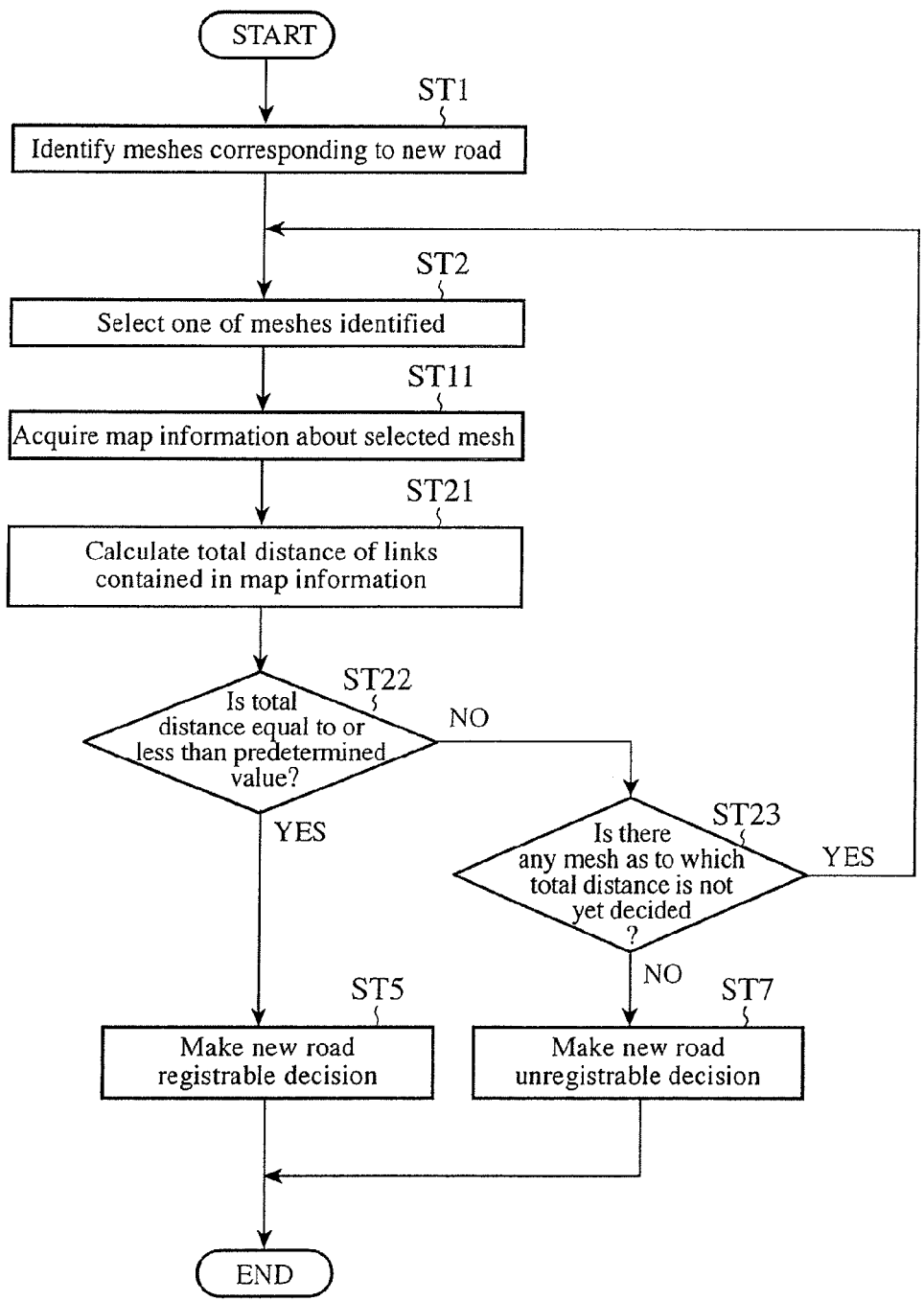
FIG. 4 is a flowchart illustrating the registration decision processing carried out by the new road registration decision section of the map information processing apparatus of an embodiment 3 in accordance with the present invention.

FIG. 4 is a flowchart illustrating the registration decision processing carried out by the new road registration decision section 20 of the map information processing apparatus of the present embodiment 3. When the new road registration decision section 20 starts the registration decision processing, it identifies the map information mesh corresponding to the new road to be decided (step ST1). When the new road extends over a plurality of meshes, all the meshes are identified. When the map information has a plurality of levels, the mesh is identified at the level the positioning section 15 uses. When the map information consists of a plurality of types of the map information, the mesh is identified in the map information of the type the positioning section 15 uses.

Subsequently, one of the meshes identified at step ST1 is selected (step ST2). Then the map information about the selected mesh is obtained (step ST11). Subsequently, the total distance is calculated of the links (roads) contained in the map information obtained at step ST11 (step ST21). The calculation of the total distance of the links is carried out by summing up the distances of the links with sequentially referring to the links contained in the map information. Subsequently, the total distance of the links calculated at step ST21 is compared with a predetermined value (step ST22). When it has been decided at step ST22 that the total distance of the links is equal to or less than the predetermined value, a new road registrable decision is made (step ST5), and the registration decision processing is completed. The decision result of the new road registration decision section 20 is delivered to the new road registration section 21 as described above.

In contrast, when it has been decided at step ST22 that the total distance of the links calculated at step ST3 is greater than the predetermined value, the presence or absence of a mesh that has not yet passed the decision as to the total distance of the links is checked among the meshes identified at step ST1 (step ST23). When it has been decided at step ST23 that the uncompleted mesh is present, the sequence is returned to step ST2. On the other hand, when it has been decided that the uncompleted mesh is not present, the new road unregistrable decision is made (step ST7), and the registration decision processing is completed. The decision result of the new road registration decision section 20 is delivered to the new road registration section 21 as described above.

As described above, the map information processing apparatus of the embodiment 3 in accordance with the present invention is configured in such a manner as to make a decision whether to conduct additional registration of the new road information to the existing map information according to the total distance of the roads, which is used as the road density, that is, the total distance between the nodes in the map information. Thus, the present embodiment 3 can add the new road not present on the map to the existing map information with eliminating or reducing the adverse effect on the navigation functions resulting from adding the new road information including the positioning error to the existing map information. In addition, since it employs the total distance between the nodes as the road density, it can calculate the road density very accurately.

Embodiment 4

To confirm the validity of the new road, the map information processing apparatus of an embodiment 4 in accordance with the present invention carries out the route calculation by using the map information including the new road detected; and decides whether to make additional registration of the new road to the map information depending on whether a recommended route obtained by the route calculation includes the new road.

Figure 5:
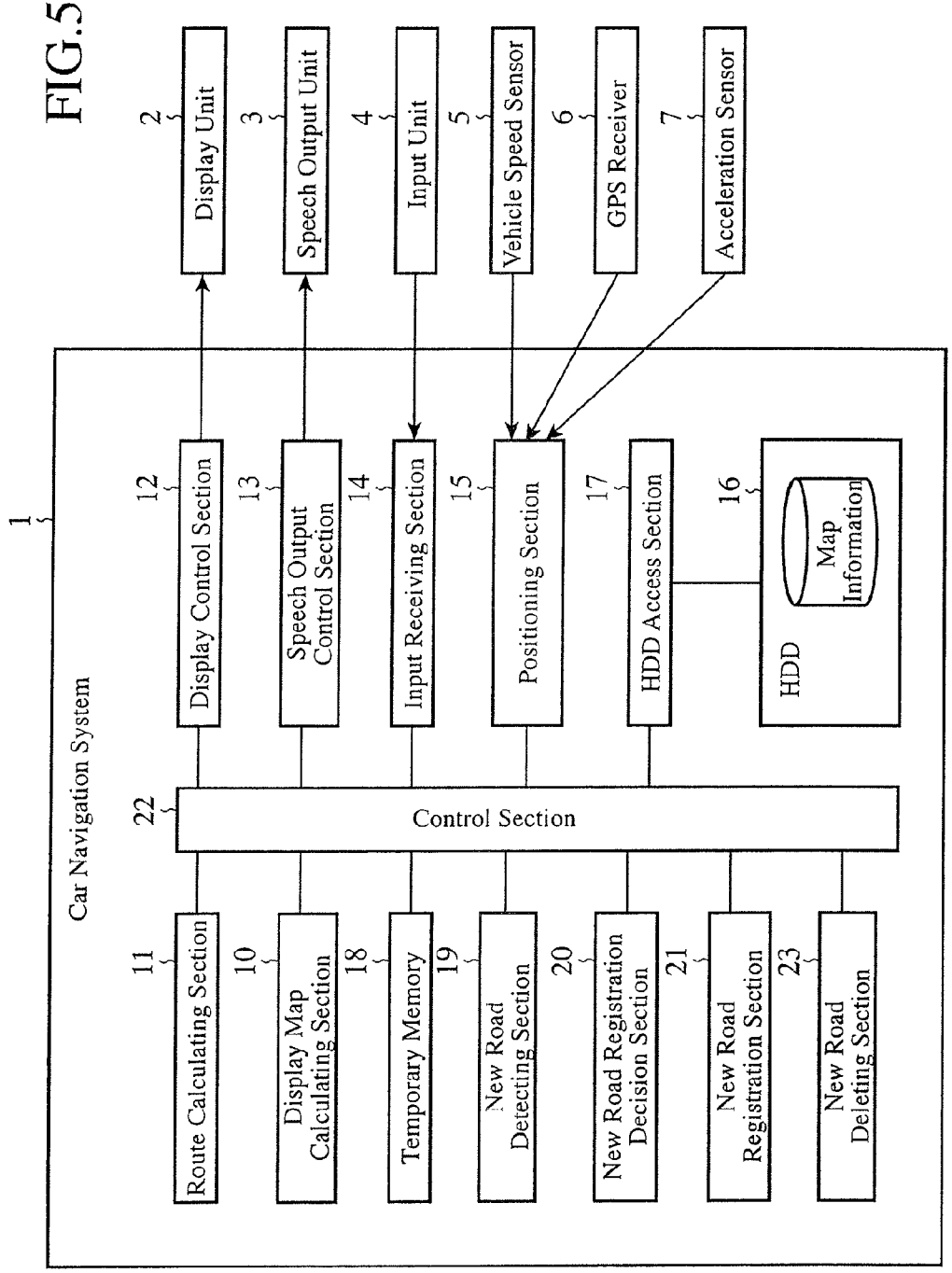
FIG. 5 is a block diagram showing a configuration of the map information processing apparatus of an embodiment 4 in accordance with the present invention.

FIG. 5 is a block diagram showing a configuration of the map information processing apparatus of the embodiment 4 in accordance with the present invention. The map information processing apparatus differs from the map information processing apparatus of the embodiment 1 in that a new road deleting section 23 is added to the car navigation system 1 of the map information processing apparatus of the embodiment 1 as shown in FIG. 1, and that the new road registration decision section 20 and new road registration section 21 carry out different processing.

The new road registration decision section 20 decides whether to make additional registration of the new road detected by the new road detecting section 19 to the map information that has already been recorded in the HDD 16 according to the calculation result of the route calculating section 11. The decision result of the new road registration decision section 20 is delivered to the new road registration section 21. The processing carried out by the new road registration decision section 20 will be described in detail later.

The new road registration section 21 makes additional registration of the new road information representing the new road detected by the new road detecting section 19 to the map information that has already been recorded in the HDD 16 by delivering the new road information to the HDD 16 via the HDD access section 17. The new road deleting section 23 deletes the new road information, which has been additionally registered to the HDD 16 by the new road registration section 21, by providing an instruction to the HDD 16 via the HDD access section 17.

Next, referring to the flowcharts shown in FIG. 6 and FIG. 7, the operation of the map information processing apparatus of the embodiment 4 in accordance with the present invention will be described with concentrating on the registration processing carried out by the new road registration section 21 and on the registration decision processing carried out by the new road registration decision section 20 when the new road detecting section 19 detects the new road. The map information processing apparatus of the embodiment 1 employs the map information size as the road density.

Figure 6:
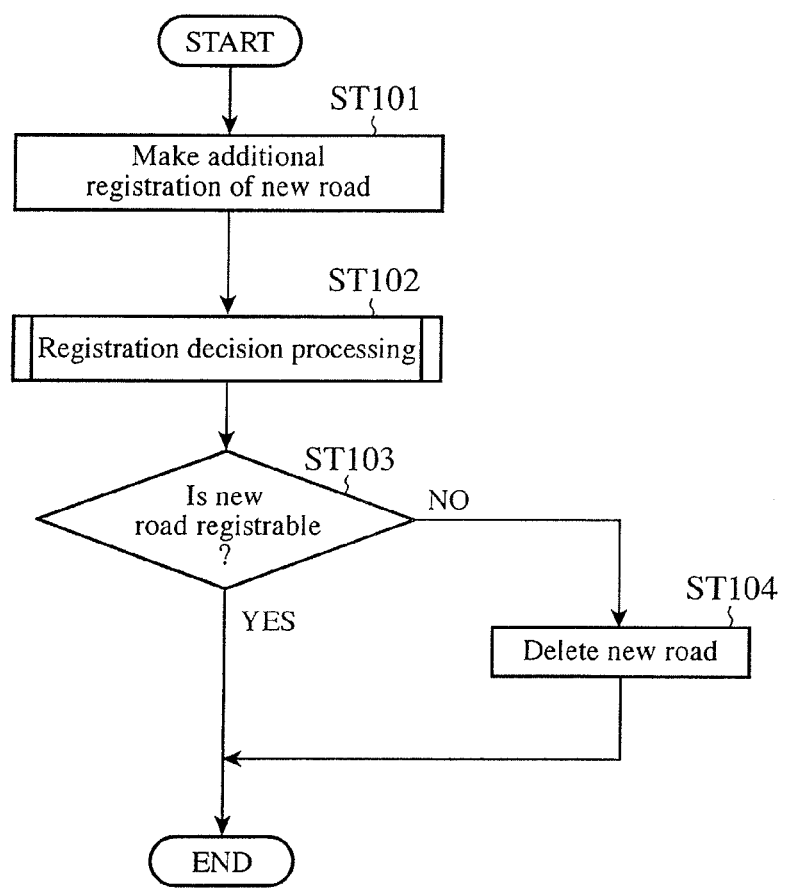
FIG. 6 is a flowchart illustrating registration processing carried out by a new road registration section of the map information processing apparatus of the embodiment 4 in accordance with the present invention.
Figure 7:
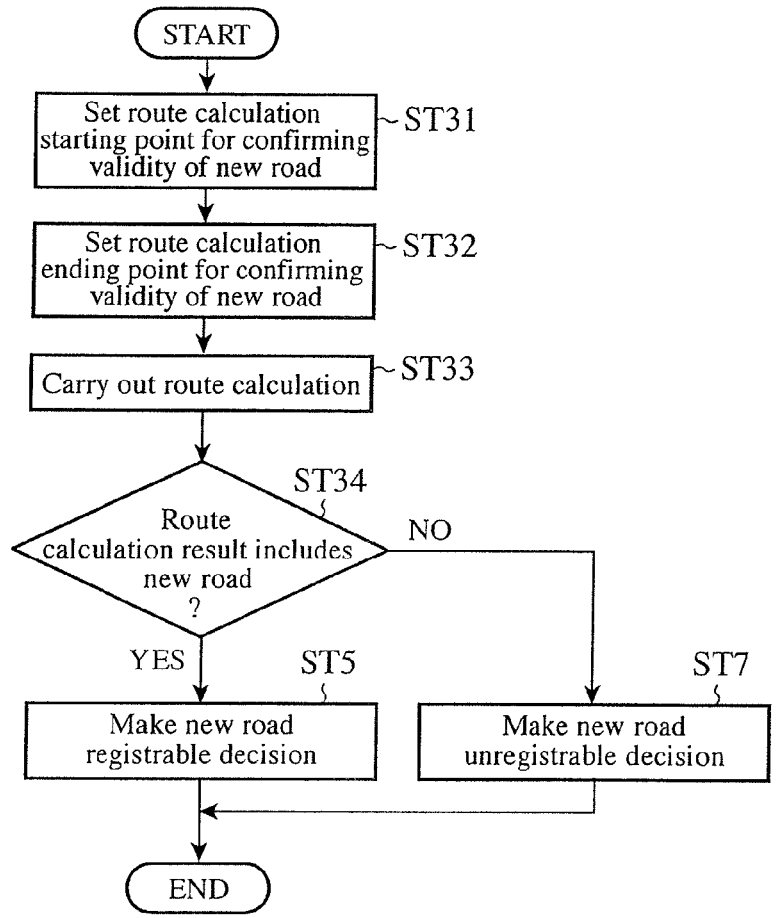
FIG. 7 is a flowchart illustrating the details of the registration decision processing shown in FIG. 6.

As shown in the flowchart of FIG. 6, when the new road detecting section 19 detects the new road, the new road registration section 21 makes additional registration of the new road detected to the map information that has already been stored in the HDD 16 (step ST101). Subsequently, the new road registration decision section 20 carries out the registration decision processing (step ST102), which will be described in detail later.

Subsequently, a decision is made as to whether the registration processing at step ST102 makes a registrable decision of the new road (step ST103). When the registrable decision is made, since the registration decision processing at step ST102 has already additionally registered the new road to the map information that has already been stored in the HDD 16, the registration processing is completed. On the other hand, when an unregistrable decision is made at step ST103, since the registration decision processing at step ST102 has already additionally registered the new road to the map information that has already been stored in the HDD 16, the processing of deleting the registered new road is carried out (step ST104). Thus, the new road deleting section 23 deletes the new road registered in the HDD 16 by the new road registration section 21.

Next, the details of the registration decision processing at step ST102 will be described with reference to the flowchart shown in FIG. 7. The registration decision processing sets a calculation starting point (search start position) used in the route calculation for confirming the validity of the new road (step ST31). As the calculation starting point, the position registered as user's house is set, for example. Subsequently, a calculation ending point (search end position) used in the route calculation is set (step ST32). As the calculation ending point, the present location of the vehicle is set, for example. Thus setting the calculation starting point and calculation ending point enables an appropriate decision as to whether the new road is an effective route for the user or not.

Subsequently, the route calculating section 11 calculates a recommended route between the starting point set at step ST31 and the ending point set at step ST32 (step ST33). Then, a decision is made as to whether the calculated recommended route includes a new road or not (step ST34). When it has been decided at step ST34 that the recommended route includes the new road, a new road registrable decision is made (step ST5), and the registration decision processing is completed. The decision result of the new road registration decision section 20 is delivered to the new road registration section 21 as described above. On the other hand, when it has been decided at step ST34 that the recommended route does not include the new road, a new road unregistrable decision is made (step ST7), and the registration decision processing is completed. The decision result of the new road registration decision section 20 is delivered to the new road registration section 21 as described above.

The route calculation at step ST33 utilizes a route calculating technique already known in the car navigation field. To calculate the recommended route between given two points by utilizing the route calculating technique, the starting point and the ending point are usually obtained as follows. First, the starting point of the route calculation is determined by searching for a nearest link (road), that is, the closest link to the given calculation starting point, and by setting the closest point on the closest link obtained by the search as the starting point (the closest point is the foot of the perpendicular from the calculation starting point to the closest link; or when no intersection point is present between the perpendicular and the closest link line, the closest point is an end point of the closest link nearer to the calculation starting point). Likewise, the ending point of the route calculation is determined by searching for a nearest link (road), that is, the closest link to the given calculation ending point, and by setting the closest point on the closest link obtained by the search as the ending point (the closest point is the foot of the perpendicular from the calculation ending point to the closest link; or when no intersection point is present between the perpendicular and the closest link line, the closest point is an end point of the closest link nearer to the calculation ending point).

Figure 8:
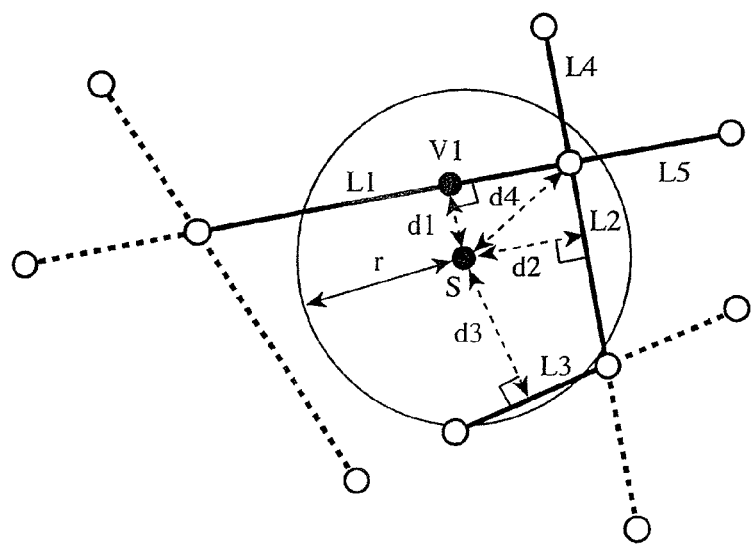
FIG. 8 is a diagram illustrating route calculating processing carried out by a route calculating section of the map information processing apparatus of the embodiment 4 in accordance with the present invention.

For example, in the conditions as shown in FIG. 8 in which a point S is given as the calculation starting point of the route search, links are searched for within a radius r (500 m, for example) from the point S. In the example as shown in FIG. 8, five links, link L1, link L2, link L3, link L4 and link L5, are found. Next, the distance from the point S to each link is calculated. When a perpendicular from the point S to the link can be drawn, the distance to the link is the length of the perpendicular. In contrast, when a perpendicular from the point S to the link cannot be drawn, the distance is defined as the distance from the point S to the closer end of the link.

In the example as shown in FIG. 8, a perpendicular can be drawn from the point S to each of the links L1, L2 and L3. Accordingly, the lengths of the perpendiculars, d1, d2 and d3, are the distances from the point S to the links. As for the links L4 and L5, a perpendicular cannot be drawn from the point S to the links. Accordingly, the distance from the point S to the closer ends of the links L4 and L5, that is, d4, is the distance from the point S to these links. The distances d1, d2, d3 and d4 calculated in this way are compared with each other, and the shortest distance d1 is obtained. Then, using the position V1 at the distance d1 from the point S as the starting point, the route calculating processing is carried out. To obtain the route calculation ending point (destination), the foregoing processing is carried out.

Although the map information processing apparatus of the present embodiment 4 is described by way of example which sets the user's house as the starting point of the route calculation for confirming the validity of the new road, and which sets the present location of the vehicle as the ending point, this is not essential. For example, to confirm the validity of the new road, it is also possible to set as the starting point a position at a predetermined distance from the position registered as the user's house, and to set as the ending point a position at a predetermined distance from the present location, offering the same advantage.

In addition, although the map information processing apparatus of the present embodiment 4 calculates the distance to each link within the predetermined radius r from the route calculation starting point or ending point, and makes the link at the shortest distance as the neighborhood link, this is not essential. For example, such a configuration is also possible that sets a rectangle of prescribed dimensions, which is formed by lines parallel to the longitudinal direction and latitudinal direction with the route calculation starting point or ending point as the central point; calculates the distance to each link in the rectangle; and sets the link at the shortest distance as the neighborhood link.

Furthermore, such a configuration is also possible that calculates the distance to each link in the mesh including the route calculation starting point or ending point, and sets the link at the shortest distance as the neighborhood link. Alternatively, such a configuration is also possible that calculates the distance to each link in the mesh including the route calculation starting point or ending point or in its neighboring meshes, and sets the link at the shortest distance as the neighborhood link.

In addition, although the map information processing apparatus of the present embodiment 4 sets the user's house as the starting point of the route calculation for confirming the validity of the new road, and sets the present location of the vehicle as the ending point, this is not essential. For example, it is possible to select any one of the positions P1 to P7 shown in FIG. 9 as the starting point (predetermined search start position). Here, P1 is the position of the user's house; P2 is the starting point of a new road M1; P3 is the position a predetermined distance short of the starting point of the new road M1; P4 is the starting (ending) point of a road before the new road M1 is detected; P5 is the starting point of a route M2 before the new road M1 is detected; P6 is the position at which the car navigation system is started; and P7 is the position from which the traveling starts that day.

Figure 9:
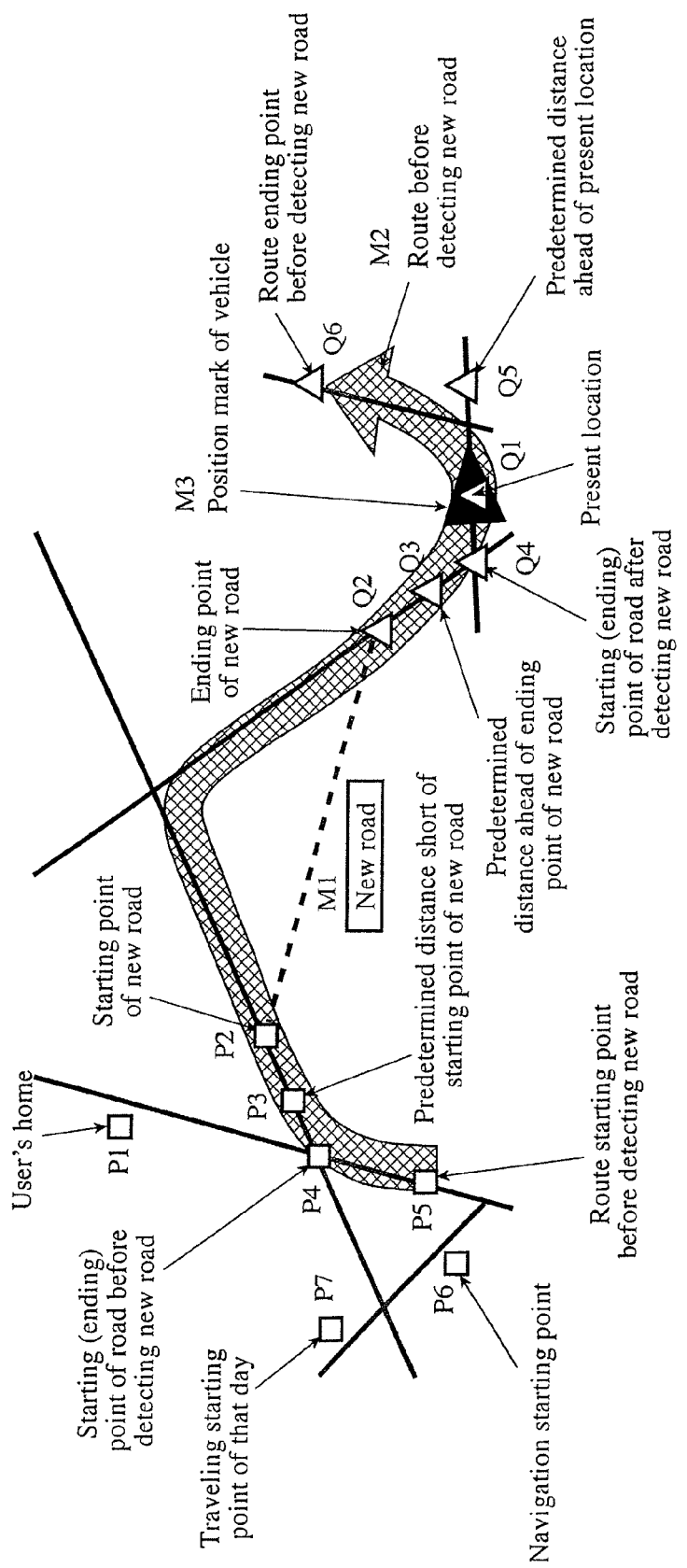
FIG. 9 is a diagram illustrating a starting point and ending point set in the route calculating processing carried out by the route calculating section of the map information processing apparatus of the embodiment 4 in accordance with the present invention.

Furthermore, it is possible to select any one of the positions Q1 to Q6 shown in FIG. 9 as the ending point (predetermined search end position). Here, Q1 is the present location M3; Q2 is the ending point of the new road M1; Q3 is the position a predetermined distance ahead of the ending point of the new road M1; Q4 is the starting (ending) point of the road after the new road M1 is detected; Q5 is the position a predetermined distance ahead of the present location M3; and Q6 is the ending point of the route M2 before the new road M1 is detected. Here, such a configuration is also possible that selects one of the points Q1-Q6 as the starting point, and one of the points P1-P7 as the ending point. Alternatively, a configuration is also possible that employs a plurality of combinations of the foregoing starting points and ending points to decide the validity.

As described above, the map information processing apparatus of the embodiment 4 in accordance with the present invention can add, among the new roads detected, only the new road convenient to the user by deciding whether to add or not from the viewpoint of the traveling distance and traveling time such as whether to employ or not as the recommended route in the route calculation. Accordingly, addition of needless new road information can be circumvented. Besides, traveling across a parking lot of facilities having different entrance and exit can be excluded from addition. Suitably selecting the route calculation starting point and ending point enables an appropriate decision as to whether the new road is convenient to the user or not.

Embodiment 5

The map information processing apparatus of an embodiment 5 in accordance with the present invention decides whether to make additional registration of the new road information to the existing map information or not according to the road type of the new road detected or to the type of a road to which the new road is joined.

The map information processing apparatus of the present embodiment 5 has the same configuration as the map information processing apparatus of the embodiment 1 shown in FIG. 1 except for the processing carried out by the new road detecting section 19 and new road registration decision section 20. At the new road information collection carried out at predetermined intervals, if the vehicle position measured by the positioning section 15 is not present on the existing roads, the new road detecting section 19 decides that the road the vehicle is traveling is a new road, and stores its coordinates to the temporary memory 18. In addition, the new road detecting section 19 calculates the traveling speed at the point of the coordinates stored in the temporary memory 18 from the traveling time and traveling distance, and stores it in the temporary memory 18 as well.

Figure 10:
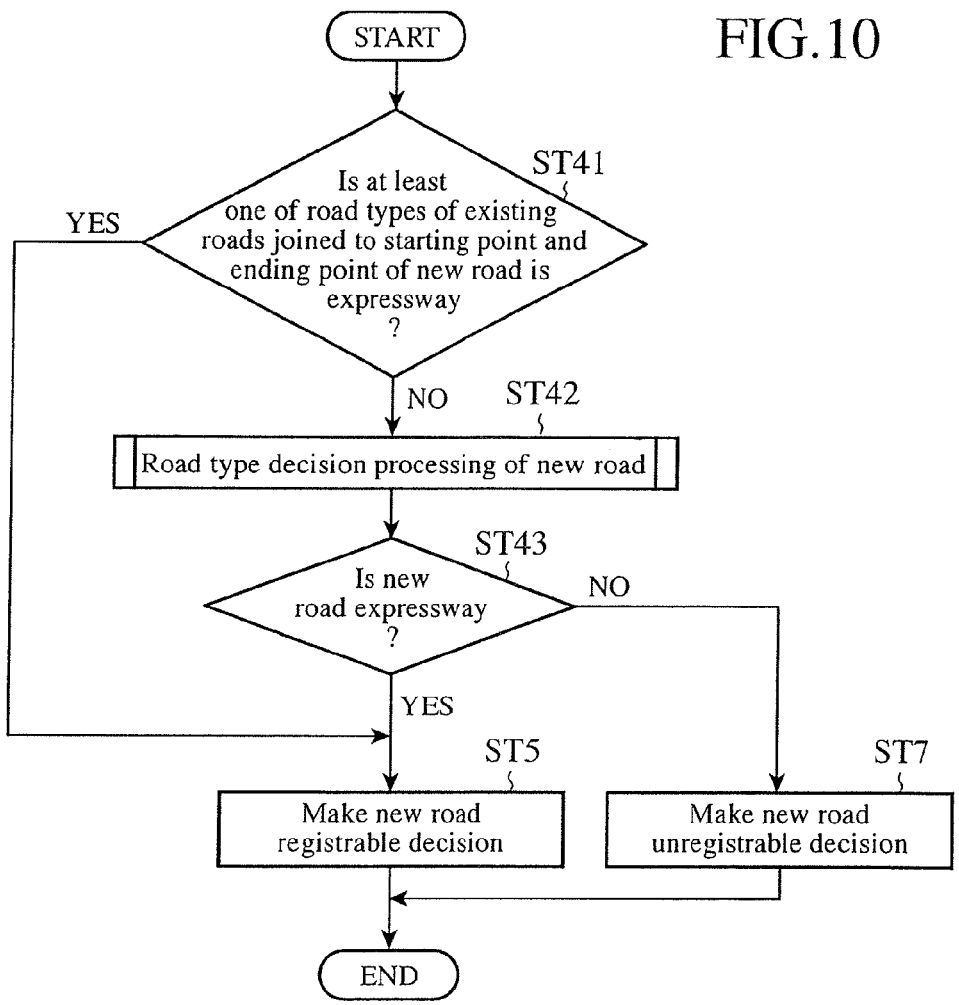
FIG. 10 is a flowchart illustrating the registration decision processing carried out by the new road registration decision section of the map information processing apparatus of an embodiment 5 in accordance with the present invention.
Figure 11:
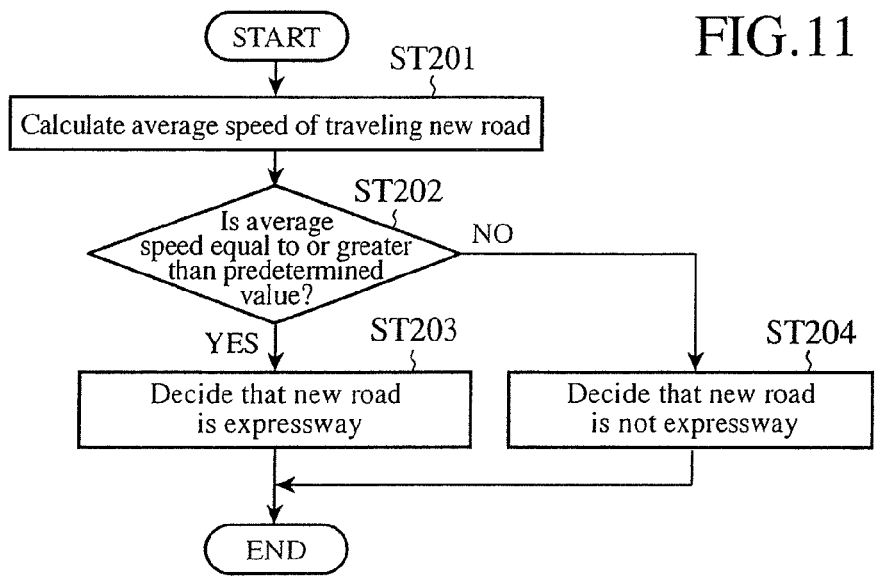
FIG. 11 is a flowchart illustrating the details of the road type decision processing of the new road illustrated in FIG. 10.

Next, referring to the flowcharts shown in FIG. 10 and FIG. 11, the operation of the map information processing apparatus of the embodiment 5 in accordance with the present invention will be described with concentrating on the registration decision processing carried out by the new road registration decision section 20.

When the new road registration decision section 20 starts the registration decision processing, it first obtains the road types of existing roads joined to the starting point and ending point of the new road to be decided. Then it checks whether at least one of them indicates an expressway (step ST41). When it has been decided at step ST41 that the road type of at least one of the existing roads joined to the starting point and ending point of the new road is an expressway, a new road registrable decision is made (step ST5), and the registration decision processing is completed. The decision result of the new road registration decision section 20 is delivered to the new road registration section 21 as described above.

On the other hand, when it has been decided at step ST41 that the road type of none of the existing roads joined to the starting point and ending point of the new road is an expressway, road type decision processing of the new road is carried out (step ST42). The details of the road type decision processing will be described later. Subsequently, according to the result of the road type decision processing, a decision is made as to whether the type of the new road is an expressway or not (step ST43). If it has been decided at step ST43 that the new road is the expressway, a new road registrable decision is made (step ST5), and the registration decision processing is completed. The decision result of the new road registration decision section 20 is delivered to the new road registration section 21 as described above. On the other hand, if it has been decided at step ST43 that the new road is not the expressway, a new road unregistrable decision is made (step ST7), and the registration decision processing is completed. The decision result of the new road registration decision section 20 is delivered to the new road registration section 21 as described above.

Next, the details of the road type decision processing of the new road carried out at step ST42 will be described with reference to the flowchart shown in FIG. 11. First, the road type decision processing of the new road calculates the average speed of traveling the new road from the speed data which is obtained at the new road information collection and stored in the temporary memory 18 (step ST201). Subsequently, a decision is made as to whether the average speed calculated is equal to or greater than a predetermined value (step ST202). When it has been decided that the average speed is equal to or greater than the predetermined value, the new road is decided as the expressway (step ST203), and the road type decision is completed. On the other hand, when it has been decided at step ST202 that the average speed is less than the predetermined value, a decision is made that the new road is not the expressway (step ST204), and the road type decision is completed.

Although the map information processing apparatus of the present embodiment 5 is configured in such a manner as to make a decision whether the new road is the expressway or not according to the average speed, this is not essential. For example, a configuration is also possible that decides the new road as an ordinary road if it includes a curve whose turning radius is less than a predetermined value.

In addition, although the map information processing apparatus of the present embodiment 5 is configured in such a manner as to make a decision whether the type of the new road is an expressway, this is not essential. For example, a configuration is also possible that makes a decision whether the new road is a toll road or a road for exclusive use of automobiles.

As described above, the map information processing apparatus of the embodiment 5 in accordance with the present invention can add a new road associated with a road of a road type convenient to the user such as an expressway (or toll road or road for exclusive use of automobiles). In addition, it can make the decision easily that the new road is an expressway (or toll road or road for exclusive use of automobiles) in an appropriate, practical way.

Embodiment 6

The map information processing apparatus of an embodiment 6 in accordance with the present invention is configured in such a manner as to decide whether to make additional registration of the new road to the existing map information by utilizing the data used by an electronic toll collection system (abbreviated to "ETC" from now on).

Figure 12:
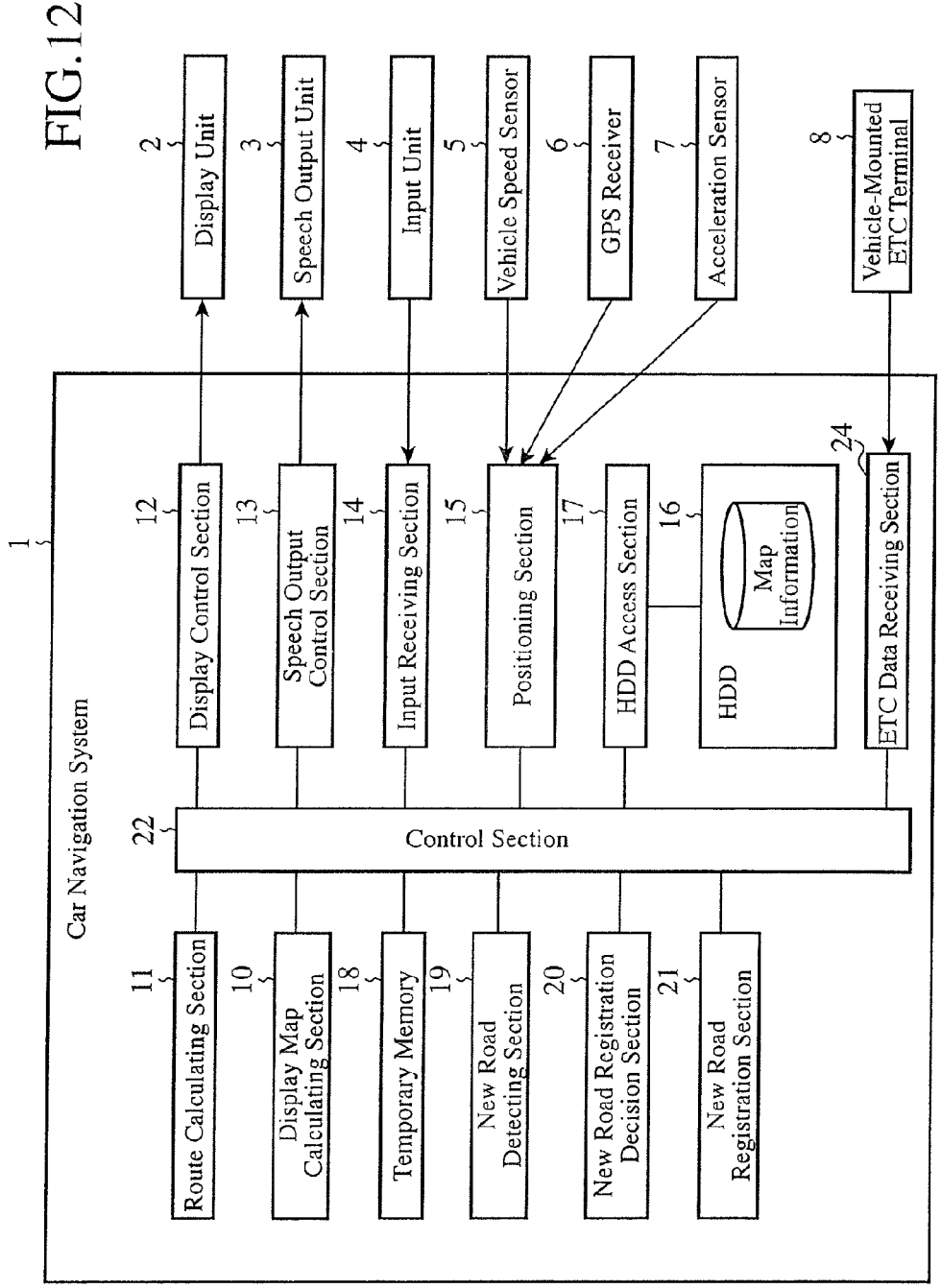
FIG. 12 is a block diagram showing a configuration of the map information processing apparatus of an embodiment 6 in accordance with the present invention.

FIG. 12 is a block diagram showing a configuration of the map information processing apparatus of the embodiment 6 in accordance with the present invention. The map information processing apparatus is configured by adding a vehicle-mounted ETC terminal 8 to the map information processing apparatus of the embodiment 1 shown in FIG. 1 and by adding an ETC data receiving section 24 to the car navigation system 1. In addition, the processing carried out by the new road detecting section 19 and new road registration decision section 20 differs from that of the map information processing apparatus of the embodiment 1.

The vehicle-mounted ETC terminal 8 transmits and receives, when passing through a gateway of a toll road (tollgate), the electronic toll collection data, the information about passing through the tollgate, through radio communications with an ETC roadside apparatus (not shown) installed in the gateway, thereby paying the toll. The electronic toll collection data transmitted and received by the vehicle-mounted ETC terminal 8 is delivered to the ETC data receiving section 24 of the car navigation system 1.

Receiving the electronic toll collection data from the vehicle-mounted ETC terminal 8, the ETC data receiving section 24 stores it in the temporary memory 18 as the toll road traveling state information. The toll road traveling state information stored in the temporary memory 18 is changed from a "toll road traveling" state to an "ordinary road traveling" state in the following cases: when the ETC data receiving section 24 receives the electronic toll collection data from the vehicle-mounted ETC terminal 8; when the positioning section 15 measures that the vehicle position is on an existing ordinary road; and when it is detected that the vehicle passes through a curve whose turning radius is less than a prescribed turning radius.

The new road detecting section 19 makes a new road decision when the vehicle position measured by the positioning section 15 is not on the existing road, and stores its coordinates to the temporary memory 18. At the same time, at the starting point of the new road, the new road detecting section 19, referring to the toll road traveling state information in the temporary memory 18, decides whether the current traveling road is a toll road or not, and stores into the temporary memory 18 the decision result with establishing correspondence with the coordinates of the starting point of the new road. In addition, when the ETC data receiving section 24 receives the electronic toll collection data from the vehicle-mounted ETC terminal 8 in the state the new road is detected, the new road detecting section 19 stores into the temporary memory 18 the changes in the toll road traveling state with establishing correspondence with the coordinates of the position.

Figure 13:
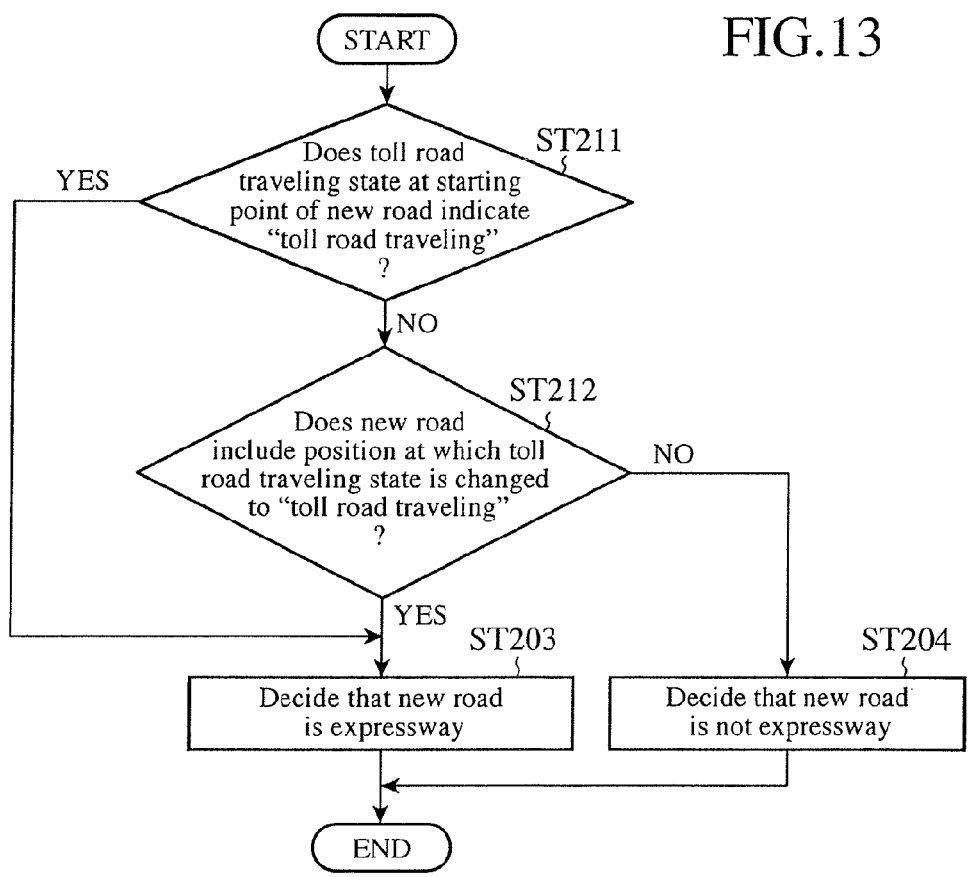
FIG. 13 is a flowchart illustrating the registration decision processing carried out by the new road registration decision section of the map information processing apparatus of the embodiment 6 in accordance with the present invention.

Next, referring to the flowchart shown in FIG. 13, the operation of the map information processing apparatus of the embodiment 6 in accordance with the present invention will be described with concentrating on the registration decision processing carried out by the new road registration decision section 20.

The registration decision processing carried out by the new road registration decision section 20 is the same as the registration decision processing of the embodiment 5 described with reference to the flowchart of FIG. 10 except for the following point. More specifically, the road type decision processing of the new road carried out at step ST42 of the flowchart shown in FIG. 10 differs from that of the embodiment 5. Here, the road type decision processing of the new road will be described in detail with reference to the flowchart shown in FIG. 13.

First, the road type decision processing of the new road decides from the temporary memory 18 as to whether the toll road traveling state at the starting point of the new road indicates the "toll road traveling" or not (step ST211). When it has been decided that it indicates the "toll road traveling", a decision is made that the new road is an expressway (step ST203), and the road type decision is completed. On the other hand, when it has been decided that it does not indicate the "toll road traveling" at step ST211, a decision is made subsequently as to whether the new road includes a position at which the toll road traveling state is changed to the "toll road traveling" or not (step ST212). The decision is made by checking the presence or absence of the coordinates of the point at which the toll road traveling state information, which is associated with the coordinates stored in the temporary memory 18 as the new road, is changed to "toll road traveling".

When it has been decided at step ST212 that the new road includes the position at which the toll road traveling state is changed to "toll road traveling", a decision is made that the new road is an expressway (step ST203), and the road type decision is completed. On the other hand, when it has been decided at step ST212 that the new road does not include the position at which the toll road traveling state is changed to "toll road traveling", a decision is made that the new road is not an expressway (step ST204), and the road type decision is completed.

Here, the map information processing apparatus of the embodiment 6 makes a backup of the information indicating the toll road traveling state stored in the temporary memory 18 into the HDD 16 when the power supply of the car navigation system 1 is turned off. When the power supply of the car navigation system 1 is turned on again, the backup information is read from the HDD 16 and developed on the temporary memory 18.

Although the present the map information processing apparatus of the embodiment 6 is configured in such a manner as to decide whether the road type of the new road is a toll road or not, this is not essential. For example, it can be configured in such a manner as to decide whether the road type of the new road is an expressway or road for exclusive use of automobiles.

As described above, the map information processing apparatus of the embodiment 6 in accordance with the present invention is configured in such a manner as to make the toll road (or expressway or road for exclusive use of automobiles) decision according to the electronic toll collection data acquired from the vehicle-mounted ETC terminal 8. Thus, it can make that decision appropriately and easily.

Embodiment 7

The map information processing apparatus of an embodiment 7 in accordance with the present invention is configured in such a manner as to decide whether to make additional registration of the new road to the existing map information depending on whether the new road detected is at a predetermined position such as in the neighborhood of the user's house.

The configuration of the map information processing apparatus of the present embodiment 7 is the same as that of the map information processing apparatus of the embodiment 1 shown in FIG. 1 except for the processing carried out by the new road registration decision section 20.

Figure 14:
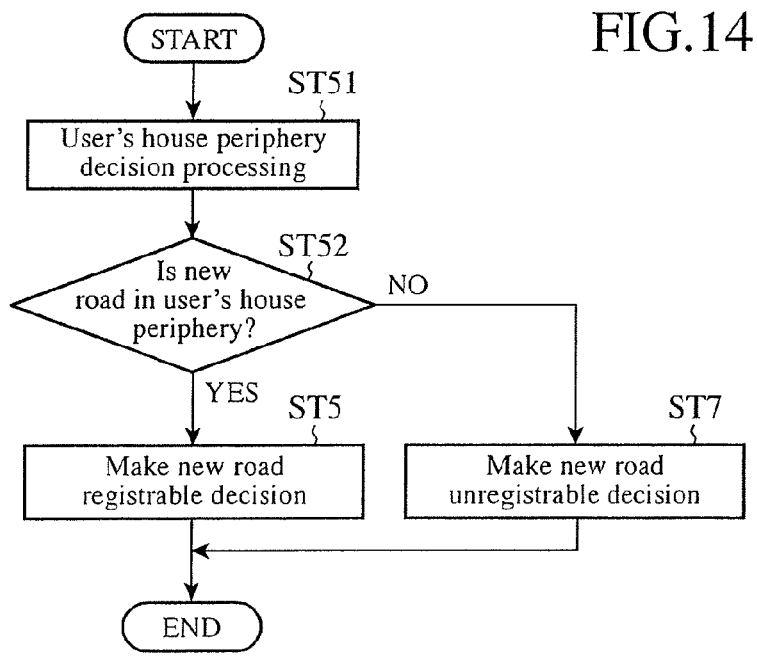
FIG. 14 is a flowchart illustrating the registration decision processing carried out by the new road registration decision section of the map information processing apparatus of an embodiment 7 in accordance with the present invention.

Next, referring to the flowchart shown in FIG. 14 the operation of the map information processing apparatus of the embodiment 7 in accordance with the present invention will be described with concentrating on the registration decision processing carried out by the new road registration decision section 20.

When the new road registration decision section 20 starts the registration decision processing, it first carries out user's house periphery decision processing of a new road (step ST51). The user's house periphery decision processing makes a decision as to whether a new road is present within a predetermined distance, 5 km, for example, from the user's house. Subsequently, according to the decision result at step ST51, a decision is made as to whether the new road is in the user's house periphery (step ST52). When it has been decided that the new road is in the user's house periphery, a new road registrable decision is made (step ST5), and the registration decision processing is completed. The decision result of the new road registration decision section 20 is delivered to the new road registration section 21 as described above. On the other hand, when it has been decided at step ST52 that the new road is not in the user's house periphery, a new road unregistrable decision is made (step ST7), and the registration decision processing is completed. The decision result of the new road registration decision section 20 is delivered to the new road registration section 21 as described above.

Although the foregoing user's house periphery decision processing is configured in such a manner as to decide whether the new road is within the predetermined distance from the user's house, this is not essential. For example, a configuration is also possible that makes a decision as to whether the new road is in the same mesh as the user's house. Alternatively, a configuration is also possible that makes a decision as to whether the new road is in the same mesh as the user's house, or in its adjacent meshes. Although the user's house periphery decision processing of the map information processing apparatus of the present embodiment 7 is configured in such a manner as to decide whether the new road is in the user's house periphery, this is not essential. For example, such a configuration is also possible that makes a decision as to whether the new road is in a periphery of a predetermined position such as a surrounding area of facilities into which the user often walks. Alternatively, a configuration is also possible that makes a decision as to whether the new road is in the periphery of the position the user registers or not.

As described above, the map information processing apparatus of the embodiment 7 in accordance with the present invention is configured in such a manner as to make additional registration of the new road to the existing map information when the new road detected is in the user's house periphery. Accordingly, the new road in the area convenient to the user can be added. In addition, the area convenient to the user can be decided appropriately and easily.

Embodiment 8

The map information processing apparatus of an embodiment 8 in accordance with the present invention is configured in such a manner that it presents to the user the result of a decision as to whether to make additional registration of the new road information representing the new road detected to the existing map information; and that when the user gives confirmation of its registration in response to the presentation, the new road information is additionally registered to the existing map information.

Figure 15:
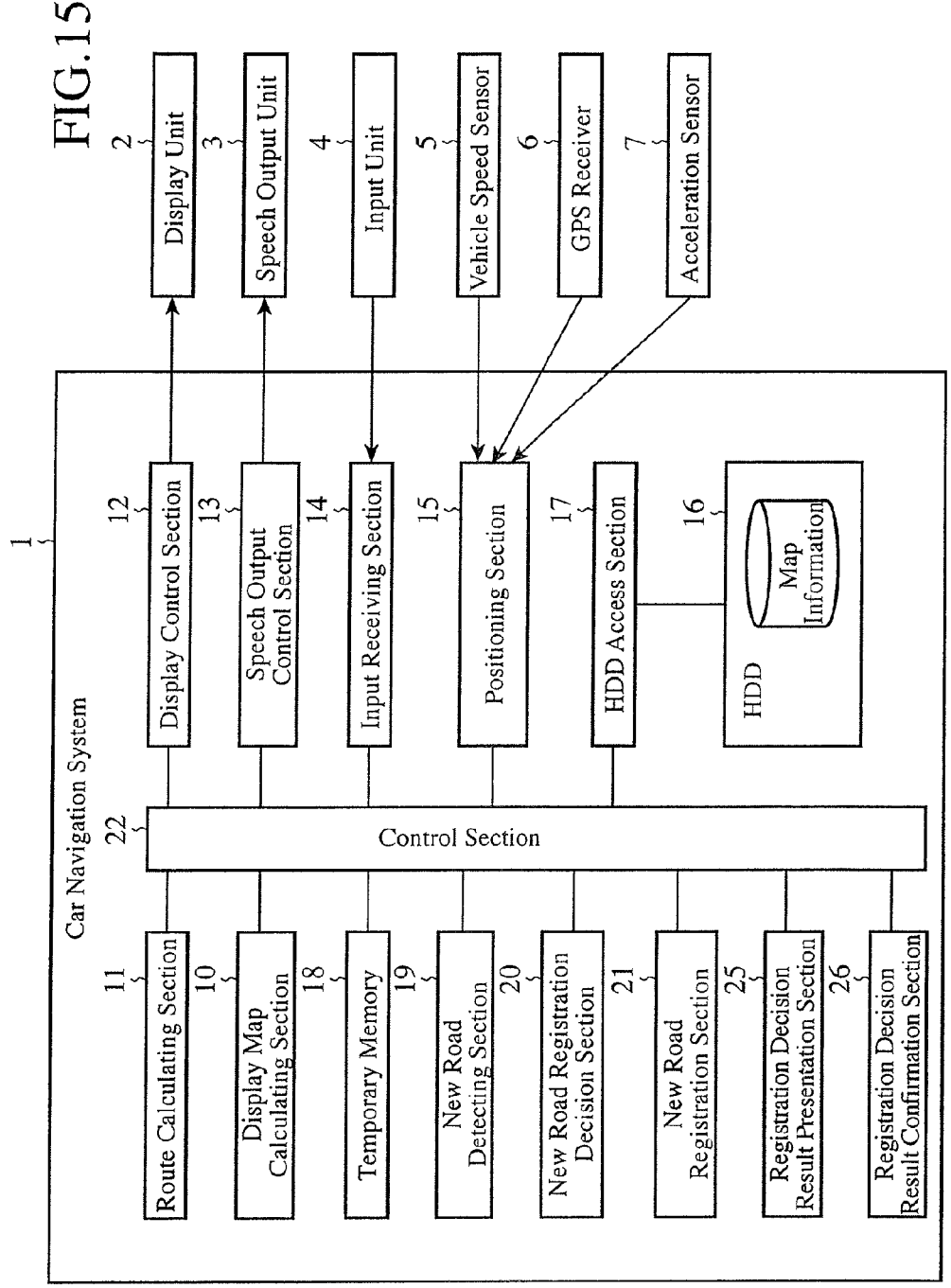
FIG. 15 is a block diagram showing a configuration of the map information processing apparatus of an embodiment 8 in accordance with the present invention.

FIG. 15 is a block diagram showing a configuration of the map information processing apparatus of the embodiment 8 in accordance with the present invention. The map information processing apparatus is configured by adding a registration decision result presentation section 25 and a registration decision result confirmation section 26 to the car navigation system 1 of the map information processing apparatus of the embodiment 1 shown in FIG. 1. In addition, it differs from the map information processing apparatus of the embodiment 1 in the processing carried out by the new road registration section 21. More specifically, the new road registration section 21 carries out the registration processing of the new road when the registration decision result confirmation section 26 gives the confirmation of registering the new road.

Figure 16:
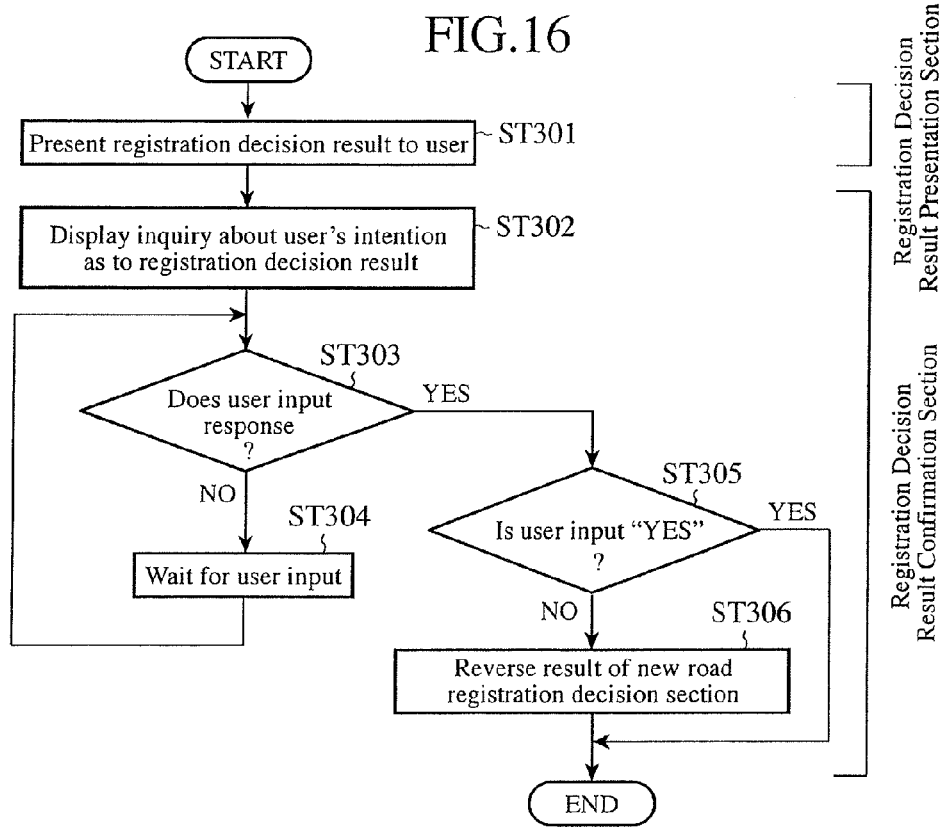
FIG. 16 is a flowchart illustrating processing carried out by a registration decision result presentation section and a registration decision result confirmation section of the map information processing apparatus of the embodiment 8 in accordance with the present invention.

Next, referring to the flowchart shown in FIG. 16, the operation of the map information processing apparatus of the embodiment 8 in accordance with the present invention will be described with concentrating on the processing carried out by the registration decision result presentation section 25 and registration decision result confirmation section 26.

Figure 17:
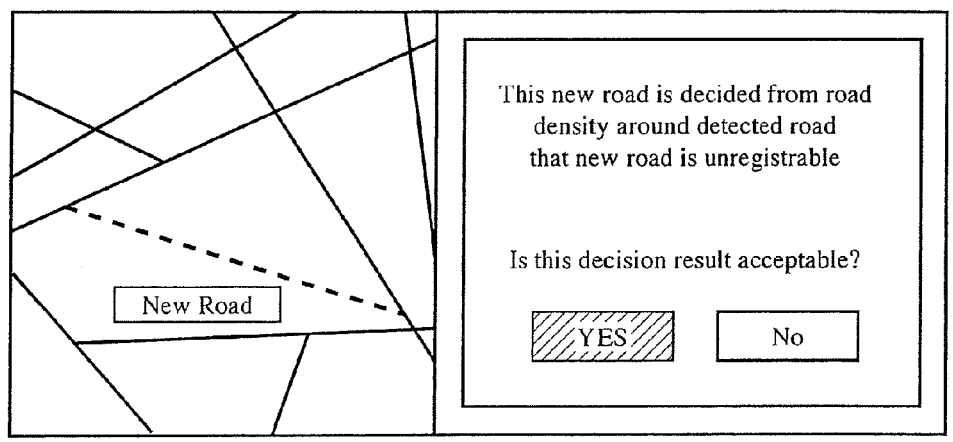
FIG. 17 is a diagram illustrating the operation of the map information processing apparatus of the embodiment 8 in accordance with the present invention.

In the processing, the registration decision result presentation section 25 presents to the user the registration decision result made by the new road registration decision section 20, first (step ST301). Subsequently, the registration decision result confirmation section 26 displays an inquiry about the user's intention regarding the registration decision result presented at step ST301 (step ST302). FIG. 17 shows an example of a picture displayed on the display unit (monitor) 2 of the car navigation system 1 after executing steps ST301 and ST302.

Next, a decision is made as to whether the user inputs a response ("yes" or "no") from the input unit 4 or not (step ST303). When it has been decided that the user has not yet input, a user input is waited for a predetermined time period (0.2 second, for example) (step ST304). After that, the sequence is returned to step ST303. On the other hand, when it has been decided at step ST303 that the user input is carried out, a decision is made as to whether the input is "yes" or not (step ST305). When it has been decided that the user input is "yes", the processing is completed. On the other hand, when it has been decided that the user input is "no", the decision result of the new road registration decision section 20 is reversed (step ST306), and the processing is completed.

As described above, the map information processing apparatus of the embodiment 8 in accordance with the present invention enables the user to recognize the registration decision result of the new road. In particular, the present embodiment 8 offers an advantage that the user can recognize that the new road is not unconditionally added to the map information even if the user travels the new road, and can recognize its cause. In addition, even when the registration decision result the system automatically calculates differs from the intention of the user about the necessity of registering the new road, the intention of user can be reflected.

INDUSTRIAL APPLICABILITY

As described above, the map information processing apparatus in accordance with the present invention is suitable for eliminating the adverse effect on the existing functions by making an appropriate decision whether to make additional registration of the new road to the existing map information or not before carrying out the registration.

What is claimed is:

1. A map information processing apparatus comprising:
a map information storage section for storing map information on an area by area basis formed in meshes;
a positioning section for measuring its own present location;
a new road detecting section for deciding that a new road is detected when the present location measured by said positioning section is on a road not included in the map information stored in said map information storage section;
a new road registration section for making additional registration of the new road detected by said new road detecting section to the map information stored in said map information storage section;
a route calculating section for calculating a recommended route from a predetermined search start position which is a calculation starting point used in a route calculation for confirming validity of the new road detected by the new road detecting section, to a predetermined search end position which is a calculation ending point used in the route calculation for confirming the validity of the new road by using the map information including the new road additionally registered to said map information storage section by said new road registration section;
a new road registration decision section for deciding that the new road is additionally registerable to the map information stored in said map information storage section when the recommended route calculated by said route calculating section includes the new road detected by said new road detecting section; and
a new road deleting section for deleting the new road that is additionally registered to said map information storage section by said new road registration section, when said new road registration decision section determines that the recommended route calculated by said route calculating section does not include the new road detected by said new road detecting section.

2. The map information processing apparatus according to claim 1, wherein one of the predetermined search start position and the predetermined search end position is selected from a first group consisting of:
a position at which a user's house is present;
the starting point of the new road detected by said new road detecting section;
a position short of the starting point of the new road detected by said new road detecting section by a predetermined distance;
a starting point or ending point of a road before said new road detecting section detects the new road;
a starting point of a route calculated by said route calculating section before said new road detecting section detects the new road;
a position at which said map information processing apparatus is started; and
a position from which traveling is started on that day, and wherein the predetermined search start position or the predetermined search end position unselected from the first group is selected from a second group consisting of:
a present location measured by said positioning section;
an ending point of the new road detected by said new road detecting section;
a position ahead of the ending point the new road detected by said new road detecting section by a predetermined distance;
the starting point or ending point of the road before said new road detecting section detects the new road;
a position ahead of the present location by a predetermined distance; and
an ending point of the route calculated by said route calculating section before said new road detecting section detects the new road.

3. The map information processing apparatus according to claim 1, further comprising a registration decision result presentation section for making a presentation of a decision result and decision reason made by said new road registration decision section.

4. The map information processing apparatus according to claim 3, further comprising:
- an input receiving section for receiving an input from an input unit; and
- a registration decision result confirmation section for confirming the decision result and decision reason presented by said registration decision result presentation section according to a content received by said input receiving section,
    - wherein said new road registration section decides that the new road is additionally registerable to the map information stored in said map information storage section when said registration decision result confirmation section confirms that the new road should be registered.

* * * * *